(12) United States Patent
Zeng et al.

(10) Patent No.: US 8,632,217 B2
(45) Date of Patent: Jan. 21, 2014

(54) LIGHT HEAD STRUCTURE WITH ADJUSTABLE FOCAL LENGTH AND LIGHTING DEVICE THEREOF

(75) Inventors: Xiao-Zhen Zeng, New Taipei (TW); Wen-Ji Lan, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 113 days.

(21) Appl. No.: 13/205,637

(22) Filed: Aug. 9, 2011

(65) Prior Publication Data

US 2013/0039069 A1     Feb. 14, 2013

(51) Int. Cl.
    *G02B 1/06*        (2006.01)
    *G02B 3/12*        (2006.01)
    *F21S 8/00*        (2006.01)
    *F21L 4/00*        (2006.01)
    *F21L 4/04*        (2006.01)

(52) U.S. Cl.
    USPC ........... 362/277; 359/665; 359/666; 362/188; 362/202

(58) Field of Classification Search
    USPC ......... 362/257, 269, 270, 276, 277, 285, 109, 362/157, 187, 188, 194, 196, 202, 208, 278, 362/318, 320, 311.03, 311.04; 359/665, 359/666, 667
    See application file for complete search history.

(56) References Cited

U.S. PATENT DOCUMENTS

| | | | | |
|---|---|---|---|---|
| 4,444,471 A * | 4/1984 | Ford et al. | ..................... | 359/676 |
| 4,783,155 A * | 11/1988 | Imataki et al. | ............... | 359/666 |
| 6,493,151 B2 * | 12/2002 | Schachar | ...................... | 359/666 |
| 7,142,369 B2 * | 11/2006 | Wu et al. | ....................... | 359/666 |
| 7,264,372 B2 * | 9/2007 | Maglica | ......................... | 362/202 |
| 7,618,154 B2 * | 11/2009 | Rosiello | ....................... | 362/202 |
| 7,697,214 B2 * | 4/2010 | Batchko et al. | ............... | 359/665 |
| 2009/0237940 A1* | 9/2009 | Wu et al. | ....................... | 362/280 |
| 2010/0202054 A1* | 8/2010 | Niederer | ....................... | 359/558 |
| 2011/0063822 A1* | 3/2011 | Qiu | ............................... | 362/188 |

* cited by examiner

*Primary Examiner* — Jong-Suk (James) Lee
*Assistant Examiner* — Alexander Garlen (57) ABSTRACT

A light head structure with adjustable focal length and a lighting device thereof. The light head structure includes a base, a threaded collar and a soft lens. The threaded collar has an assembling section, a receiving space for receiving the base therein and a protrusion section formed on an inner circumference of the threaded collar. The base has a recess for receiving a light-emitting element therein and an outer connection section for movably assembling with the assembling section. The soft lens has a focusing section in alignment with the light-emitting element. The focusing section has an extension section. The protrusion section of the threaded collar abuts against the extension section to attach the extension section to the outer circumference of the base. The thickness of the soft lens is adjustable to change the focal length and enhance the illumination. The lighting device can be easily manufactured to lower manufacturing cost.

19 Claims, 10 Drawing Sheets

LIGHT HEAD STRUCTURE WITH ADJUSTABLE FOCAL LENGTH AND LIGHTING DEVICE THEREOF

BACKGROUND OF THE INVENTION

1. Field of the Invention

The present invention relates generally to a light head structure with adjustable focal length and a lighting device thereof. The light head structure includes a soft lens. The thickness of the soft lens is adjustable to change the focal length and enhance the illumination. The lighting device can be easily manufactured to lower manufacturing cost.

2. Description of the Related Art

A flashlight is a portable lighting device, which is often used outdoors or as an emergency lighting device in a blackout. The projection range of a common flashlight is unadjustable as desired. This is inconvenient when it is necessary to change the scattering angle of the flashlight. Therefore, an improved flashlight with adjustable focal length has been developed to solve the above problem.

The conventional lighting device (flashlight) with adjustable focal length includes a light head and a barrel body mated with the light head. An optical lens is disposed in the light head. The light head can be rotated up and down to adjust the distance (focal length) between a light-emitting element (such as an LED) and the lens. When a user needs to illuminate a nearby place, the user can turn the light head downward in a direction to the barrel body so as to shorten the distance between the light-emitting element and the lens. In this case, the light emitted from the light-emitting element will pass through the lens and scatter. On the contrary, when the user needs to illuminate a remote place, the user can turn the light head upward in a direction away from the barrel body so as to elongate the distance between the light-emitting element and the lens. In this case, the light emitted from the light-emitting element will pass through the lens and converge.

Such conventional lighting device is able to achieve a zoom effect. However, when manufacturing the lighting device, it is necessary to manufacture a specific optical lens with a specifically developed mold for projecting the light of the light-emitting element to a preset range. Accordingly, the application range of the lighting device is quite narrow. Moreover, due to the zoom structure, the lighting device is complicated as a whole.

Furthermore, when changing the optical design of the lighting device in adaptation to the market or on the demand of a client, it is necessary to redesign the optical lens and redevelop a new mold. This leads to increase of cost and working time.

According to the above, the conventional lighting device has the following shortcomings:
1. The cost is increased.
2. The structure is complicated.
3. The working time is prolonged.

SUMMARY OF THE INVENTION

A primary object of the present invention is to provide a light head structure with adjustable focal length. The light head structure can provide better illumination and is manufactured at lower cost.

A further object of the present invention is to provide the above light head structure with adjustable focal length. The light head structure is easy to manufacture so that the working time is shortened.

A still further object of the present invention is to provide a lighting device, which can provide better illumination and is manufactured at lower cost.

A still further object of the present invention is to provide the above lighting device, which is easy to manufacture so that the working time is shortened.

To achieve the above and other objects, the light head structure of the present invention includes a threaded collar, a base and a soft lens. The base has a recess for receiving a light-emitting element therein and an outer connection section annularly disposed on an outer circumference of the base. The threaded collar has an assembling section, a receiving space for receiving the base therein and a protrusion section formed on an inner circumference of the threaded collar. The assembling section is movably assembled with the outer connection section.

The soft lens is disposed between the base and the threaded collar. The soft lens has a focusing section in alignment with the light-emitting element. The focusing section has an extension section extending from the focusing section. The extension section is positioned between the threaded collar and the outer circumference of the base. The protrusion section correspondingly abuts against the extension section to attach the extension section to the outer circumference of the base. The soft lens has better transparency. When adjusting and moving the threaded collar up or down, the silicone-made soft lens is extended or contracted to change the focal length and enhance the illumination effect of the light head structure. The light head structure can be easily manufactured so that the working time is shortened and the manufacturing cost is lowered.

The lighting device of the present invention includes a light-emitting element, a light head structure and a barrel body. The barrel body has a support section protruding from one end of the barrel body and a switch member electrically connected to the light-emitting element. The light head structure is mated with the support section. The light head structure includes a base, a threaded collar and a soft lens. The base has a recess for receiving therein the light-emitting element and an outer connection section annularly disposed on an outer circumference of the base.

The threaded collar has an assembling section, a receiving space and a protrusion section formed on an inner circumference of the threaded collar. The base is received in the receiving space. The assembling section is correspondingly movably assembled with the outer connection section. The soft lens is disposed between the base and the threaded collar. The soft lens has a focusing section in alignment with the light-emitting element. The focusing section has an extension section outward extending from the focusing section. The extension section is positioned between the threaded collar and the outer circumference of the base. The protrusion section correspondingly abuts against the extension section.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
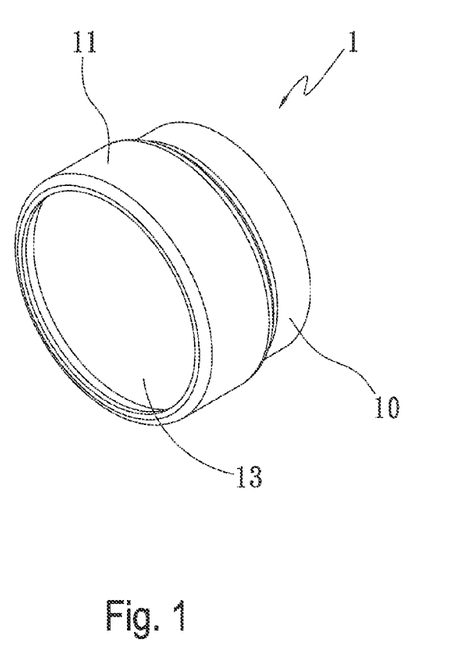
FIG. 1 is a perspective assembled view of a first embodiment of the present invention.
Figure 2:
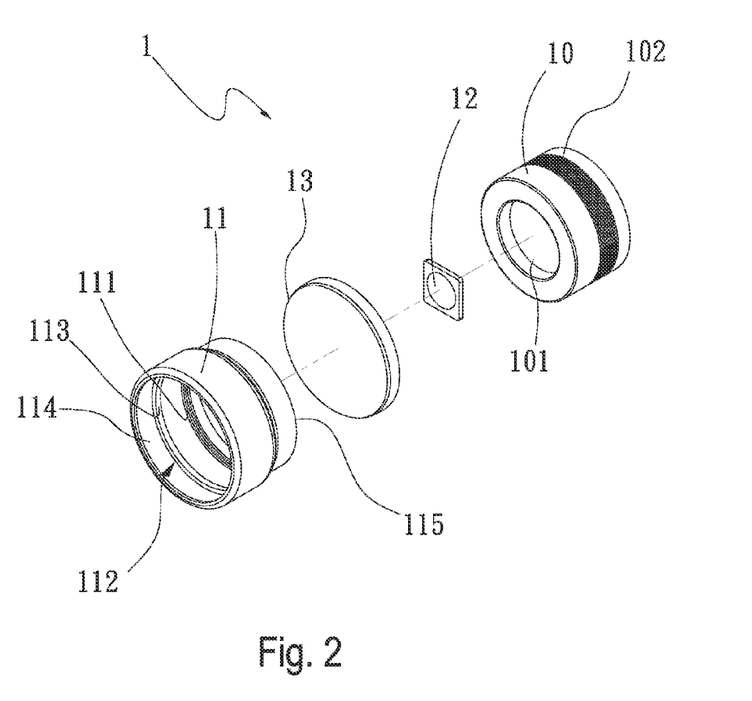
FIG. 2 is a perspective exploded view of the first embodiment of the present invention.
Figure 3A:
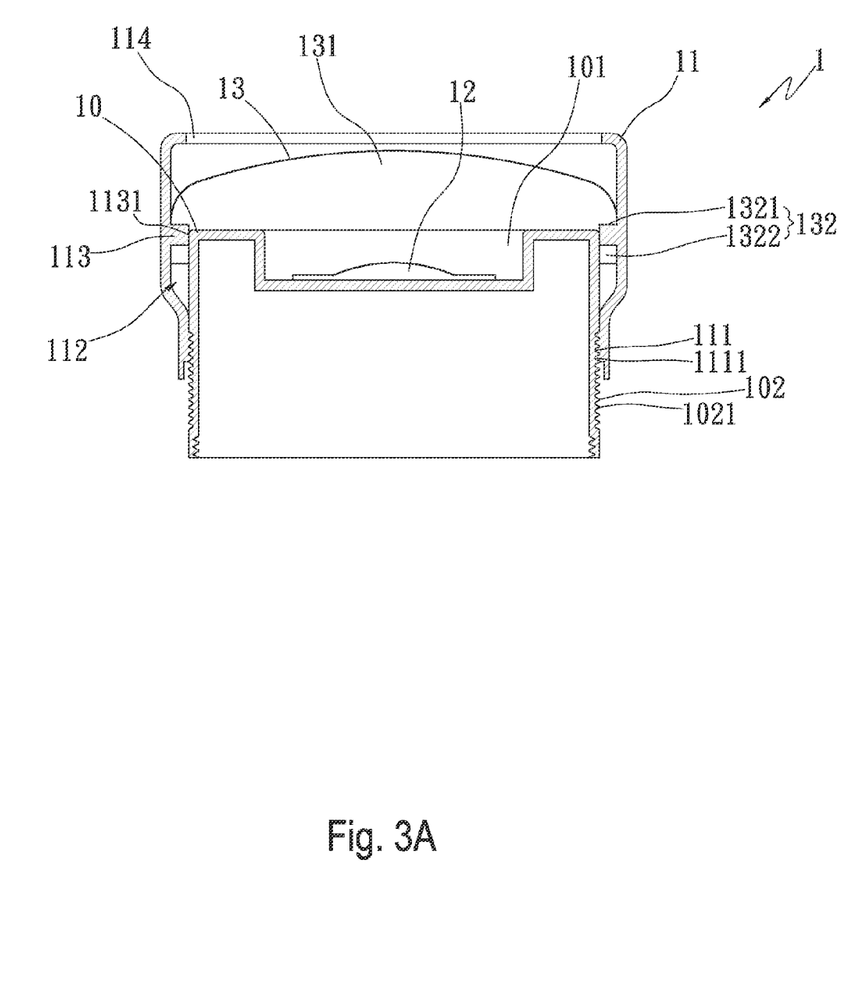
FIG. 3A is a sectional assembled view of the first embodiment of the present invention in one state.
Figure 3B:
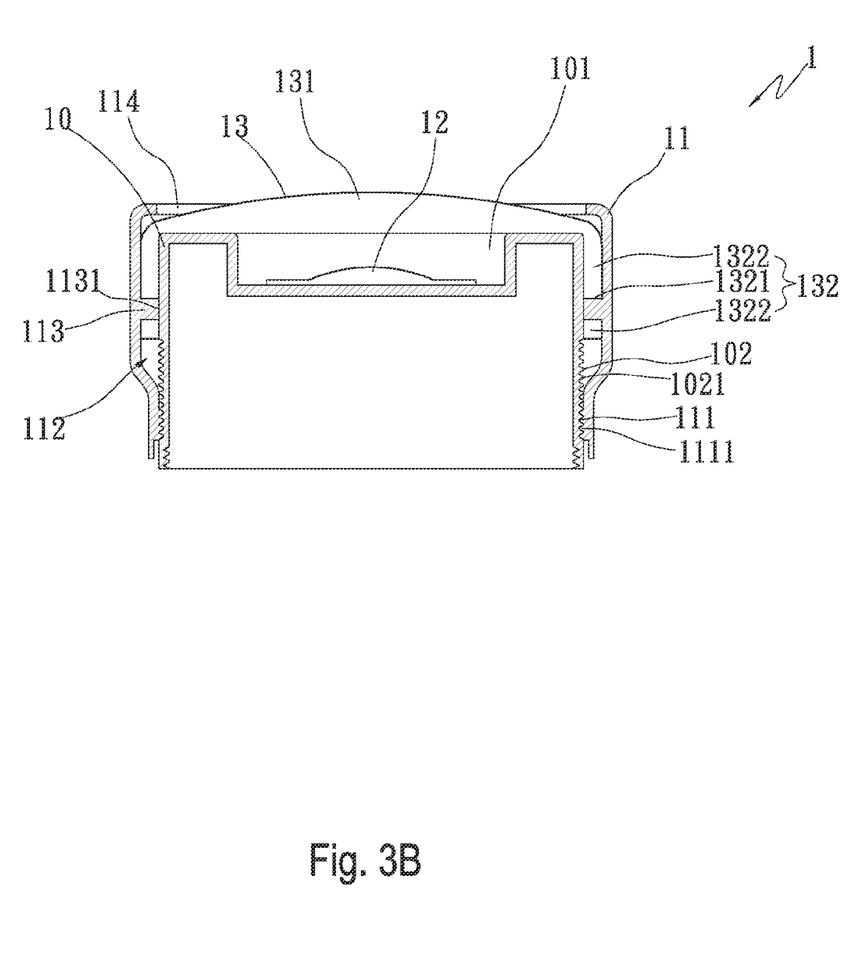
FIG. 3B is a sectional assembled view of the first embodiment of the present invention in another state.

The present invention relates to a light head structure with adjustable focal length and a lighting device thereof. Please refer to FIGS. 1, 2, 3A and 3B. FIG. 1 is a perspective assembled view of a first embodiment of the present invention. FIG. 2 is a perspective exploded view of the first embodiment of the present invention. FIG. 3A is a sectional assembled view of the first embodiment of the present invention in one state. FIG. 3B is a sectional assembled view of the first embodiment of the present invention in another state. According to the first embodiment, the light head structure 1 of the present invention includes a base 10, a threaded collar 11 and a soft lens 13. The base 10 has a recess 101 and an outer connection section 102. A light-emitting element 12 is received in the recess 101. In this embodiment, the light-emitting element 12 is, but not limited to, a light-emitting diode (LED) for illustration purposes only. Alternatively, the light-emitting element 12 can be a tungsten filament bulb. The outer connection section 102 is annularly disposed on an outer circumference of the base 10 and formed with multiple first outer threads 1021. The outer threads 1021 are positioned between two ends of the base 10.

The threaded collar 11 has a hollow receiving space 112, a protrusion section 113, a first open side 114, a second open side 115 and an assembling section 111 corresponding to the outer threads 1021 of the outer connection section 102 of the base 10. The first and second open sides 114, 115 are opposite to each other to together define the receiving space 112. The threaded collar 11 is capped on the base 10. The protrusion section 113 is formed on an inner circumference of the threaded collar 11 corresponding to the outer circumference of the base 10. That is, the protrusion section 113 is formed on the inner circumference of the threaded collar 11 between the first open side 114 and the assembling section 111. The protrusion section 113 has a free end 1131 protruding from the inner circumference of the threaded collar 11 to the outer circumference of the base 10.

The assembling section 111 is correspondingly movably assembled with the outer connection section 102. The assembling section 111 has multiple first inner threads 1111 formed on the inner circumference of the threaded collar 11 in adjacency to the second open side 115. The first inner threads 1111 are adjustably screwed on the first outer threads 1021, whereby the threaded collar 11 is movable between a first position and a second position. Referring to FIG. 3A, the first inner threads 1111 of the threaded collar 11 are screwed upward along the first outer threads 1021, whereby the threaded collar 11 is moved from the second position to the first position in a direction away from the base 10. Referring to FIG. 3B, the first inner threads 1111 of the threaded collar 11 are screwed downward along the first outer threads 1021, whereby the threaded collar 11 is moved from the first position to the second position in a direction to the base 10.

In practice, the threaded collar 11 can be freely moved to any position between the first and second positions according to the desired focal length and illumination range.

Please further refer to FIG. 1 as well as FIG. 3A. The soft lens 13 is made of silicone or any other suitable material. In this embodiment, the soft lens 13 is made of silicone for illustration purposes only. Due to the specific properties of silicone, the soft lens 13 can keep a high transparency to visible spectrum and the change of refractive index in the optical path is minified. This helps in enhancing the luminous efficiency of the light-emitting element.

The soft lens 13 is disposed between the base 10 and the threaded collar 11. The soft lens 13 has a focusing section 131 in alignment with the light-emitting element 12. The focusing section 131 has an extension section 132 outward extending from the focusing section 131. The extension section 132 is positioned between the threaded collar 11 and the outer circumference of the base 10. The extension section 132 extends along the outer circumference of the base 10 to a position adjacent to the outer connection section 102. The extension section 132 has an abutted section 1321 and a non-abutted section 1322 on two sides of the abutted section 1321. The free end 1131 abuts against the abutted section 1321. (That is, the protrusion section 113 correspondingly abuts against the extension section 132). Accordingly, the extension section 132 is attached to the outer circumference of the base 10. The radian of the top of the focusing section 131 is variable with the movement of the threaded collar 11 between the first and second positions. To speak more specifically, when the threaded collar 11 is moved to the first position as shown in FIG. 3A, the radian of the top of the focusing section 131 becomes smaller. On the contrary, when the threaded collar 11 is moved to the second position as shown in FIG. 3B, the radian of the top of the focusing section 131 becomes larger.

Accordingly, when it is desired to zoom the lens 13 so as to change the illumination of the light head structure 1, the threaded collar 11 is screwed up or down to adjust the position thereof. At this time, the first inner threads 1111 of the assembling section 111 are screwed up or down along the first outer threads 1021 of the outer connection section 102. In the meantime, the protrusion section 113 is moved up or down along with the threaded collar 11. At the same time, the abutted section 1321 is driven to move up or down along the outer circumference of the base 10 to extend or contract the extension section 132 and adjust the thickness of the focusing section 131, (that is, change the thickness of the focusing section 131). Accordingly, the focal length of the lens 13 is changed to vary the light projection angle of the light-emitting element 12.

According to the above arrangement, the threaded collar 11, the base 10 and the soft lens 13 are integrally connected with each other. These components can be easily manufactured and assembled so that the working time is shortened and the manufacturing cost is lowered. Moreover, the illumination of the light head structure 1 is enhanced.

Figure 4:
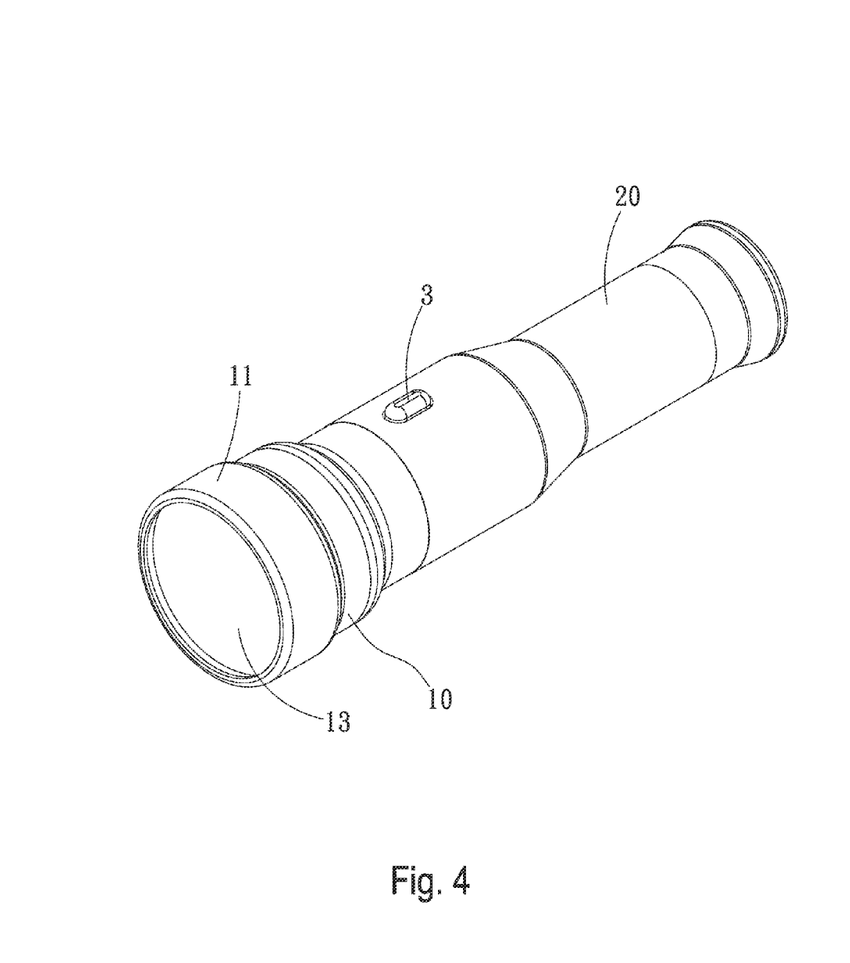
FIG. 4 is a perspective assembled view of a second embodiment of the present invention.
Figure 5:
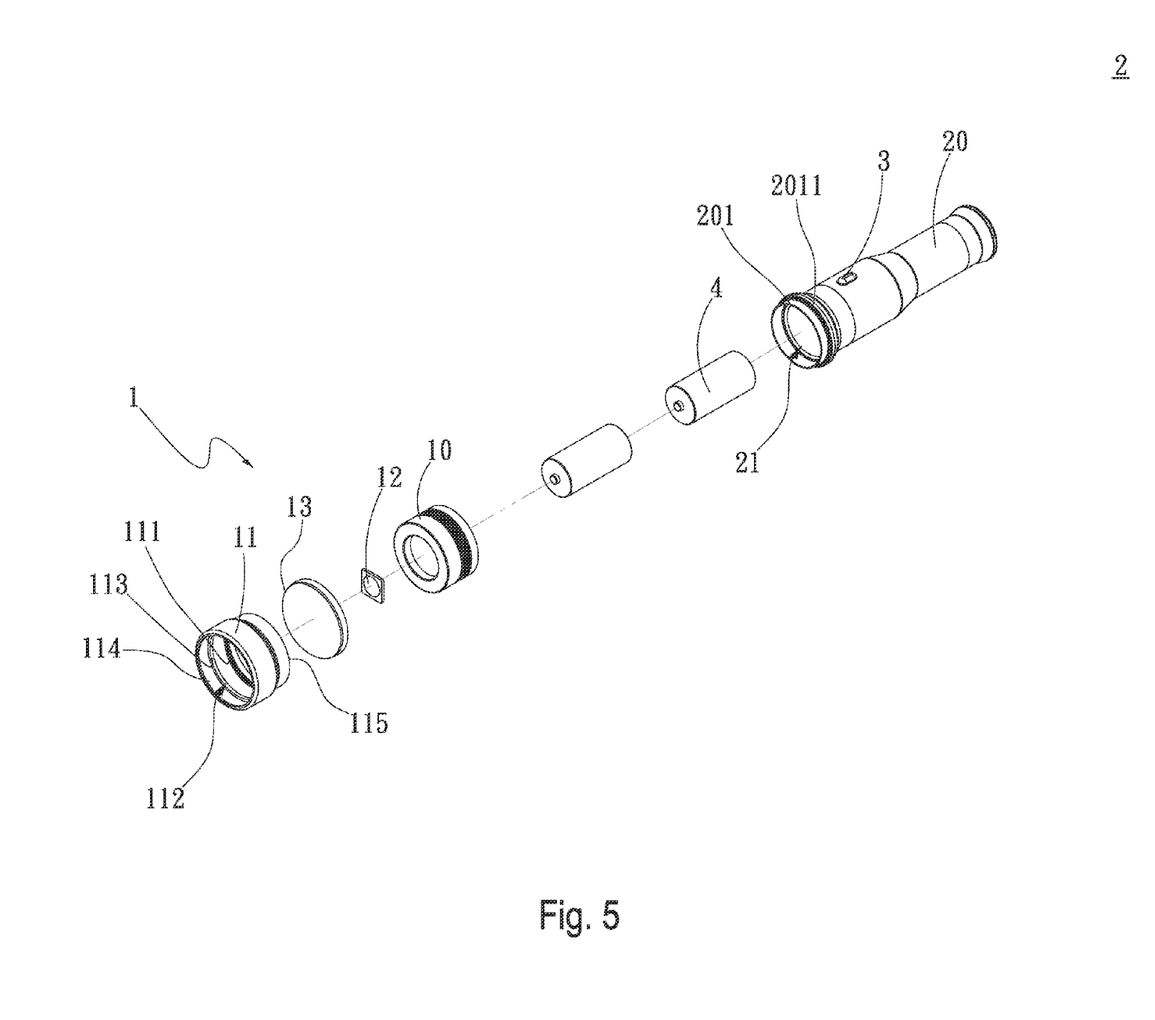
FIG. 5 is a perspective exploded view of the second embodiment of the present invention.
Figure 6A:
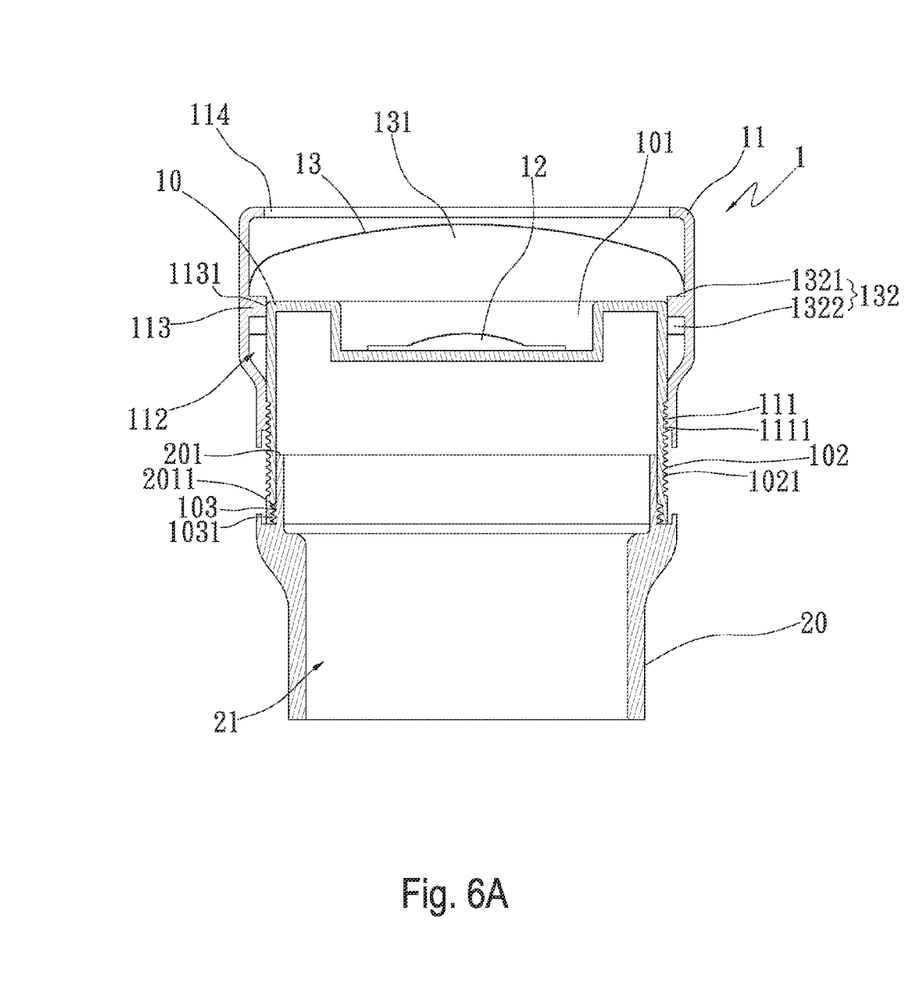
FIG. 6A is a sectional assembled view of the second embodiment of the present invention in one state.

Please refer to FIGS. 4, 5, 6A and 6B. FIG. 4 is a perspective assembled view of a second embodiment of the present invention. FIG. 5 is a perspective exploded view of the second embodiment of the present invention. FIG. 6A is a sectional assembled view of the second embodiment of the present invention in one state.

Figure 6B:
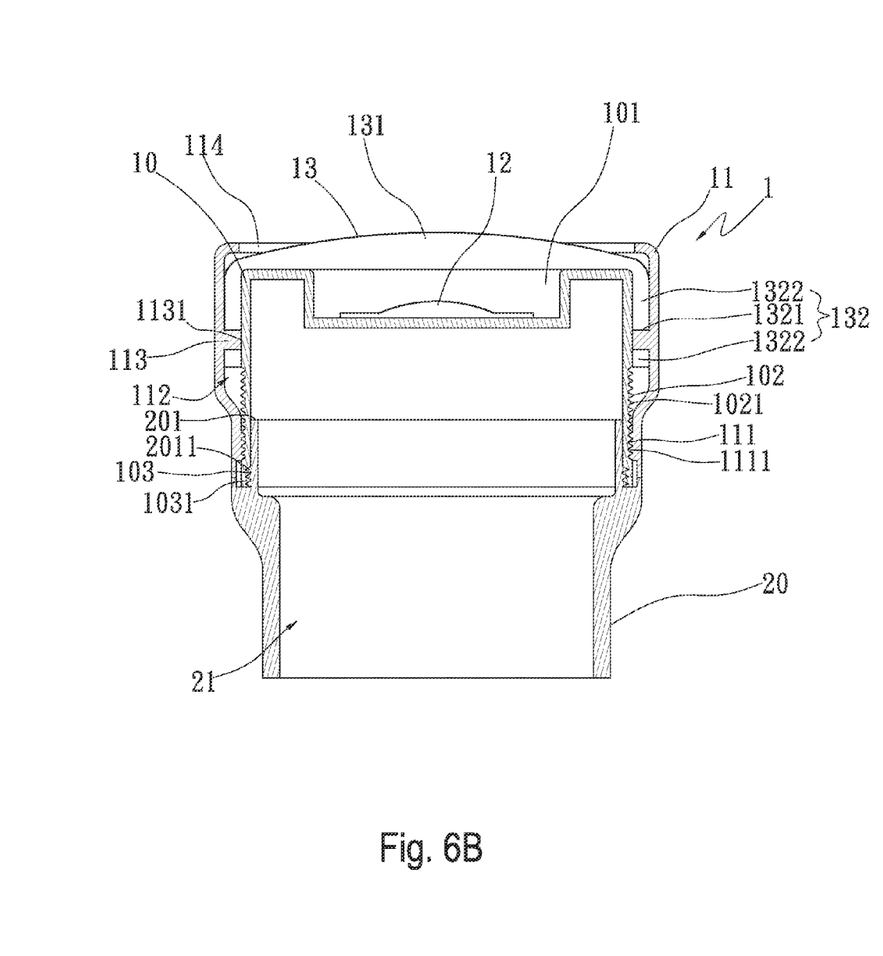
FIG. 6B is a sectional assembled view of the second embodiment of the present invention in another state.

FIG. 6B is a sectional assembled view of the second embodiment of the present invention in another state. According to the second embodiment, the light head structure 1 of the present invention is applied to a lighting device 2 such as a flashlight or a spotlight. The lighting device 2 includes a light-emitting element 12, a barrel body 20 and a light head structure 1. The light-emitting element 12 can be a light-emitting diode (LED) or a tungsten filament bulb.

The second embodiment is substantially identical to the first embodiment in structure and connection relationship between the components and function and thus will not be repeatedly described hereinafter. The second embodiment is different from the first embodiment in that the base 10 further includes an inner connection section 103 having multiple second inner threads 1031. The second inner threads 1031 are annularly disposed on an inner circumference of one end of the base 10.

The barrel body 20 is mated with the base 10 of the light head structure 1. The barrel body 20 includes a support section 201, a switch member 3 and a receiving space 21 in which cells 4 are received. The cells 4 are electrically connected to the light-emitting element 12 for supplying power to the light-emitting element 12. The support section 201 protrudes from one end of the barrel body 20 corresponding to the base 10. The support section 201 has multiple second outer threads 2011. The second outer threads 2011 are annularly disposed on an outer circumference of the support section 201 corresponding to the second inner threads 1031. Accordingly, the second inner threads 1031 can be screwed on the second outer threads 2011 to fixedly connect the base 10 with the barrel body 20. The switch member 3 is disposed on the barrel body 20 and electrically connected to the light-emitting element 12 for controlling turning on/off of the light-emitting element 12.

Please further refer to FIGS. 6A and 6B. When a user wants to focus the light beam projected from the light head of the lighting device, (that is, to minify the scattering angle), the user screws the threaded collar 11 downward. At this time, the first inner threads 1111 of the assembling section 111 are screwed downward along the first outer threads 1021 of the outer connection section 102. In the meantime, the protrusion section 113 is moved downward along with the threaded collar 11. At the same time, the abutted section 1321 is driven to move downward along the outer circumference of the base 10 to extend the extension section 132 and thin the thickness of the focusing section 131. Accordingly, the light beam of the light-emitting element 12 will pass through the focusing section 131 to be projected from the light head in a focused state.

When a user wants to scatter the light beam projected from the light head of the lighting device, (that is, to enlarge the scattering angle), the user screws the threaded collar 11 upward. At this time, the first inner threads 1111 of the assembling section 111 are screwed upward along the first outer threads 1021 of the outer connection section 102. In the meantime, the protrusion section 113 is moved upward along with the threaded collar 11. At the same time, the abutted section 1321 is driven to move upward along the outer circumference of the base 10 to contract the extension section 132 and thicken the thickness of the focusing section 131. Accordingly, the light beam of the light-emitting element 12 will be refracted and projected from the light head in a scattered state. Therefore, the focal length of the soft lens 13 is changeable.

According to the above arrangement, the soft lens 13 of the lighting device of the present invention has better transparency. Moreover, the thickness of the soft lens 13 is adjustable to change the focal length and enhance the illumination. In addition, the components of the lighting device can be easily manufactured and assembled so that the working time is shortened and the manufacturing cost is lowered.

Figure 7:
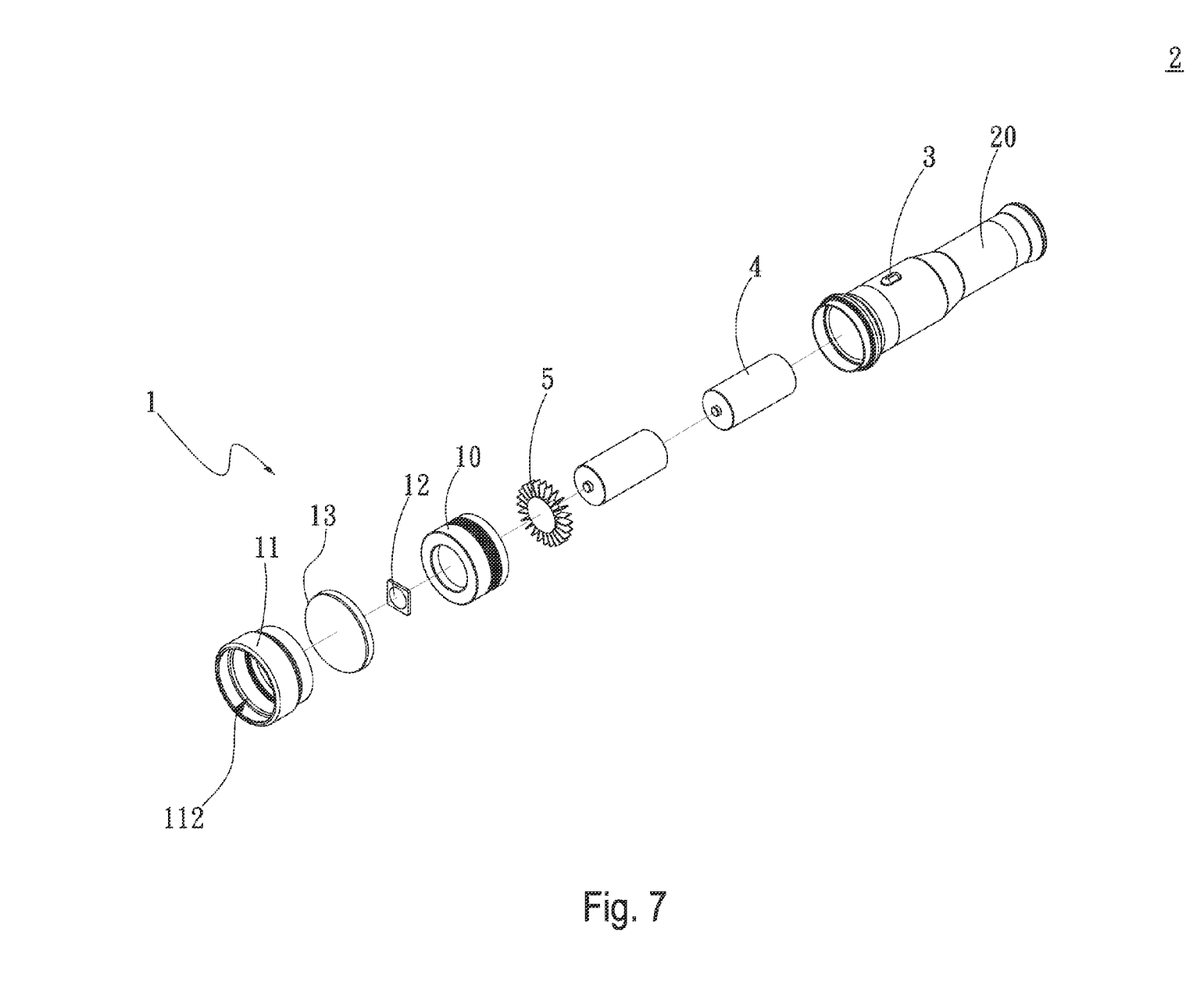
FIG. 7 is a perspective exploded view of a third embodiment of the present invention.
Figure 8A:
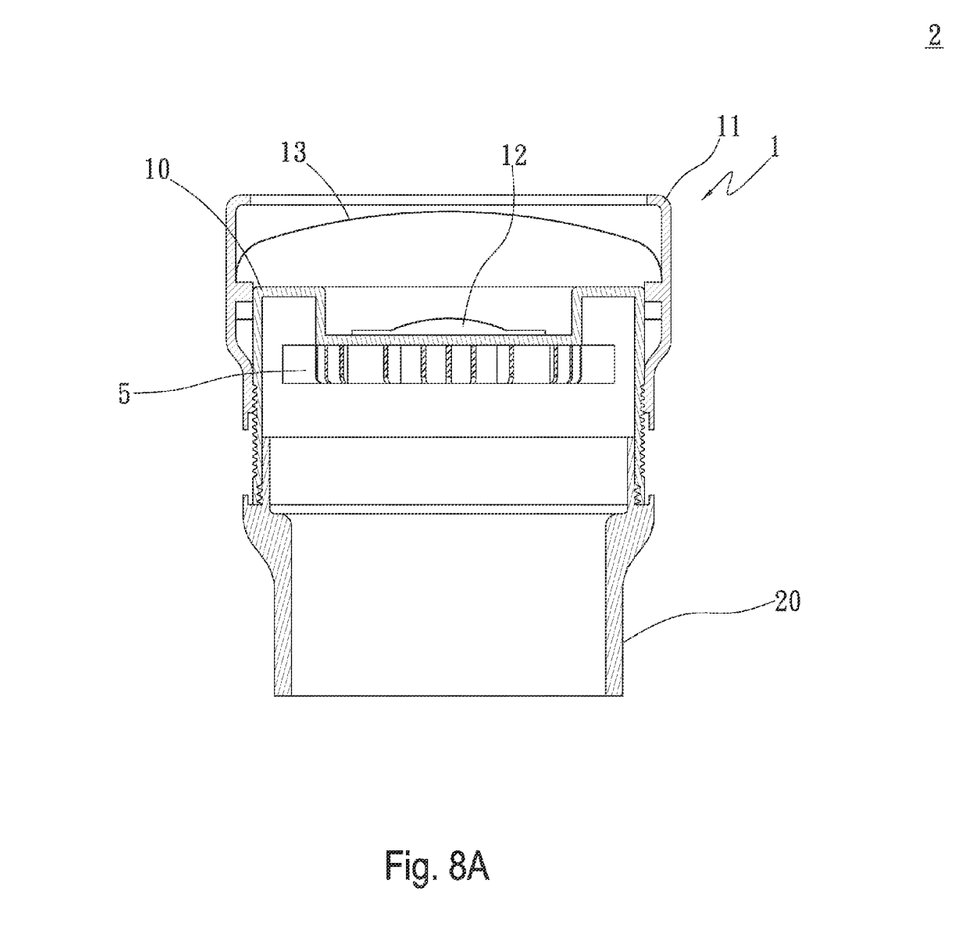
FIG. 8A is a sectional assembled view of the third embodiment of the present invention in one state.
Figure 8B:
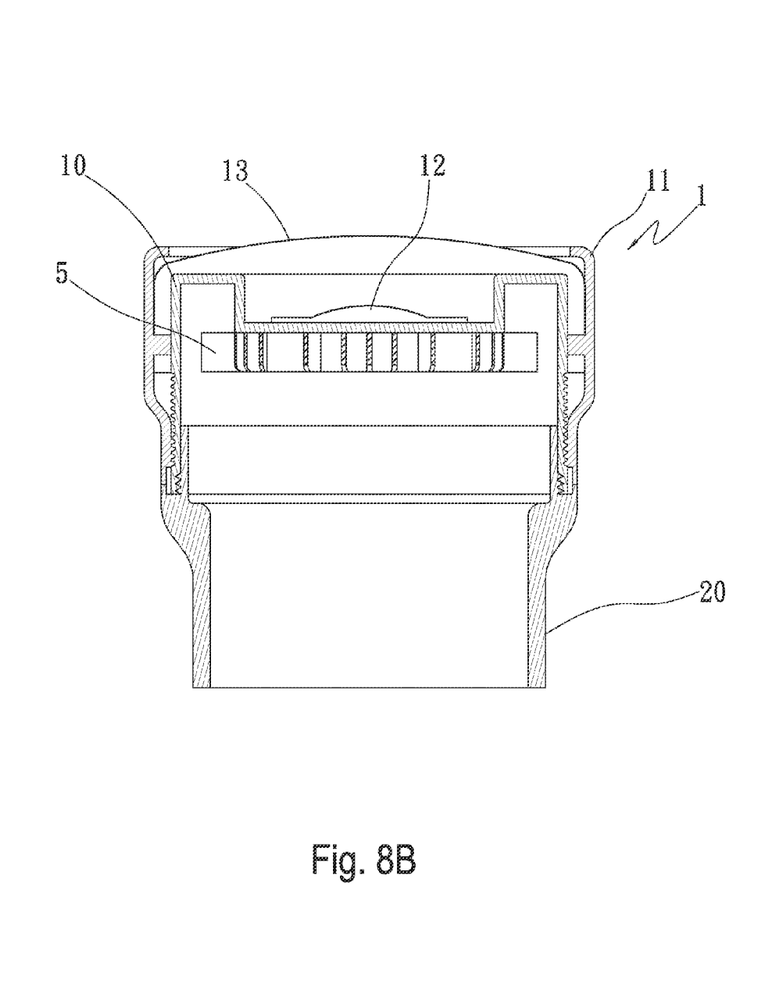
FIG. 8B is a sectional assembled view of the third embodiment of the present invention in another state.

Please refer to FIGS. 7, 8A and 8B. FIG. 7 is a perspective exploded view of a third embodiment of the present invention. FIG. 8A is a sectional assembled view of the third embodiment of the present invention in one state. FIG. 8B is a sectional assembled view of the third embodiment of the present invention in another state.

The third embodiment is substantially identical to the second embodiment in structure and connection relationship between the components and function and thus will not be repeatedly described hereinafter. The third embodiment is different from the second embodiment in that the lighting device 2 further includes a heat sink 5 with multiple radiating fins. The heat sink 5 is disposed on one side of the base 10 opposite to the light-emitting element 12 corresponding to the barrel body 20. The heat sink 5 serves to absorb the heat generated by the light-emitting element 12 to achieve heat dissipation effect.

According to the above arrangement, in comparison with the conventional device, the present invention has the following advantages:

1. The manufacturing cost is lowered.
2. The working time is shortened.
3. The structure is simplified.
4. The illumination is enhanced.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A light head structure with adjustable focal length, comprising:

a base having a recess and an outer threaded connection section, the recess serving to receive a light-emitting element therein, the outer threaded connection section being annularly disposed on an outer circumference of the base;

a threaded collar having an assembling section, a receiving space and a protrusion section formed on an inner circumference of the threaded collar, the threaded collar being capped on the base with the assembling section correspondingly assembled with the outer threaded connection section; and a lens that can be deformed to change its focal characteristics disposed between the base and the threaded collar, the lens having a focusing section in alignment with the light-emitting element, the focusing section having an extension section extending from the focusing section, the extension section being positioned between the threaded collar and the outer circumference of the base, the protrusion section of the threaded collar correspondingly abutting against the extension section, wherein the protrusion section of the threaded collar has a free end protruding from the inner circumference of the threaded collar to the outer circumference of the base, wherein a section of the extension section of the lens abuts the protrusion section and a non-abutting section of the extension is located on either side of the extension section that abuts the protrusion section on two sides of the abutted section, the free end of the protrusion section abutting against the abutted section to attach the extension section to the outer circumference of the base, wherein the threaded collar is movable between an extended position and a contracted position to extend or contract the extension section in order to adjust the thickness of the focusing section.

2. The light head structure with adjustable focal length as claimed in claim 1, wherein the threaded collar has a first open side and a second open side opposite to the first open side, the first and second open sides together defining the receiving space.

3. The light head structure with adjustable focal length as claimed in claim 2, wherein the outer connection section has multiple first outer threads, the first outer threads being annularly disposed on the outer circumference of the base corresponding to the assembling section of the threaded collar.

4. The light head structure with adjustable focal length as claimed in claim 3, wherein the assembling section has multiple first inner threads formed on the inner circumference of the threaded collar in adjacency to the second open side, the first inner threads being adjustably screwed on the first outer threads, whereby the threaded collar is movable between a first position and a second position to extend or contract the extension section and adjust the thickness of the focusing section.

5. The light head structure with adjustable focal length as claimed in claim 3, wherein the lens is made of silicone or any other suitable material.

6. The light head structure with adjustable focal length as claimed in claim 3, wherein the light-emitting element is a light-emitting diode or a tungsten filament bulb.

7. The light head structure with adjustable focal length as claimed in claim 1, wherein the base is mated with a barrel body, the barrel body including a receiving space and a support section protruding from one end of the barrel body corresponding to the base, the support section having multiple second outer threads, the second outer threads being annularly disposed on an outer circumference of the support section.

8. The light head structure with adjustable focal length as claimed in claim 7, wherein the base further includes an inner connection section having multiple second inner threads, the second inner threads being annularly disposed on an inner circumference of one end of the base corresponding to the second outer threads of the support section, whereby the second inner threads can be screwed on the second outer threads to fixedly connect the base with the barrel body.

9. The light head structure with adjustable focal length as claimed in claim 8, wherein a switch member is disposed on the barrel body and electrically connected to the light-emitting element for controlling turning on/off of the light-emitting element.

10. The light head structure with adjustable focal length as claimed in claim 9, wherein cells are received in the receiving space of the barrel body and electrically connected to the light-emitting element for supplying power to the light-emitting element.

11. A lighting device comprising:
a light-emitting element;
a barrel body having a support section and a switch member, the support section protruding from one end of the barrel body, the switch member being electrically connected to the light-emitting element; and
a light head structure mated with the barrel body, the light head structure including:
a base having a recess and an outer threaded connection section, the outer connection section being annularly disposed on an outer circumference of the base, the light-emitting element being received in the recess;
a threaded collar having an assembling section, a hollow receiving space and a protrusion section, the threaded collar being capped on the base, the protrusion section being formed on an inner circumference of the threaded collar corresponding to the outer circumference of the base, the assembling section being correspondingly movably assembled with the outer threaded connection section; and
a lens that can be deformed to change its focal characteristics disposed between the base and the threaded collar, the soft lens having a focusing section in alignment with the light-emitting element, the focusing section having an extension section outward extending from the focusing section, the extension section being positioned between the threaded collar and the outer circumference of the base, the protrusion section of the threaded collar correspondingly abutting against the extension section, wherein the protrusion section of the threaded collar has a free end protruding from the inner circumference of the threaded collar to the outer circumference of the base, wherein a section of the extension section of the lens abuts the protrusion section and a non-abutting section of the extension section is located on either side of the extension section that abuts the protrusion section on two sides of the abutted section, the free end of the protrusion section abutting against the abutted section to attach the extension section to the outer circumference of the base, wherein the threaded collar is movable between an extended position and a contracted position to extend or contract the extension section in order to adjust the thickness of the focusing section.

12. The lighting device as claimed in claim 11, wherein the threaded collar has a first open side and a second open side opposite to the first open side, the first and second open sides together defining the receiving space.

13. The lighting device as claimed in claim 12, wherein the outer connection section has multiple first outer threads, the first outer threads being annularly disposed on the outer circumference of the base corresponding to the assembling section of the threaded collar.

14. The lighting device as claimed in claim 13, wherein the assembling section has multiple first inner threads formed on the inner circumference of the threaded collar in adjacency to the second open side, the first inner threads being adjustably screwed on the first outer threads, whereby the threaded collar is movable between a first position and a second position to extend or contract the extension section and adjust the thickness of the focusing section.

15. The lighting device as claimed in claim 11, wherein the barrel body has a receiving space for receiving cells therein, the cells being electrically connected to the light-emitting element, the support section having multiple second outer threads, the second outer threads being annularly disposed on an outer circumference of the support section.

16. The lighting device as claimed in claim 15, wherein the base further includes an inner connection section having multiple second inner threads, the second inner threads being annularly disposed on an inner circumference of one end of the base corresponding to the second outer threads of the support section, whereby the second inner threads can be screwed on the second outer threads to fixedly connect the base with the barrel body.

17. The lighting device as claimed in claim 15, further comprising a heat sink disposed on one side of the base opposite to the light-emitting element corresponding to the barrel body.

18. The lighting device as claimed in claim 13, wherein the lens is made of silicone or any other suitable material.

19. The lighting device as claimed in claim 13, wherein the light-emitting element is a light-emitting diode or a tungsten filament bulb.

* * * * *